United States Patent [19]
Reed et al.

[11] Patent Number: 5,652,885
[45] Date of Patent: Jul. 29, 1997

[54] INTERPROCESS COMMUNICATIONS SYSTEM AND METHOD UTILIZING SHARED MEMORY FOR MESSAGE TRANSFER AND DATAGRAM SOCKETS FOR MESSAGE CONTROL

[75] Inventors: Dennis F. Reed; David L. Trachy, both of Louisville; James W. Montgomery, Boulder, all of Colo.

[73] Assignee: Storage Technology Corporation, Louisville, Colo.

[21] Appl. No.: 66,213

[22] Filed: May 25, 1993

[51] Int. Cl.$^6$ .................................................. G06F 13/00
[52] U.S. Cl. .......................................................... 395/651
[58] Field of Search ................................. 395/650, 700

[56] References Cited

U.S. PATENT DOCUMENTS

| | | | |
|---|---|---|---|
| 4,447,874 | 5/1984 | Bradley et al. | 364/200 |
| 4,694,396 | 9/1987 | Weisshaar et al. | 364/300 |
| 5,089,954 | 2/1992 | Rago | 395/600 |
| 5,129,085 | 7/1992 | Yamasaki | 395/650 |
| 5,214,759 | 5/1993 | Yamaoka et al. | 395/200 |
| 5,230,051 | 7/1993 | Quan | 395/700 |
| 5,257,369 | 10/1993 | Skeen et al. | 395/650 |
| 5,440,687 | 8/1995 | Coleman et al. | 395/200.15 |

OTHER PUBLICATIONS

Duncan, Ray, "Interprocess Communication in OS-2", Dr. Dobb's Journal of Software Tools, Jun. 1989 V14 N6 p. 14(7).

Tomassini, Marco, "Programming with Sockets", C Users Journal Sep. 1991 v9 N9 p. 39(14).

Shaw, Richard Hale, "A Complete Guide to OS/2 Interprocess Communications and Device Monitors", Microsoft Systems Journal, Sep. 1989 v4 N5 p. 35(26).

Barfield, Ed; Walters, Brian, "How to Write Client./Server Socket Programs In Digitals Pathworks Environment", VAX Professional, Mar.–Apr. 1992 v14 N2 p.7(8).

Scoredos, Eric, Scott, Kimberly, van Gaasbeck, Richard, "HRUX Kernel Communications Modules for a Card–Based OSI Protocol Stack", Hewlett–Packard Journal, Aug. 1990 v41 N4 p40(10).

*Primary Examiner*—Kevin A. Kriess
*Attorney, Agent, or Firm*—Sterne, Kessler, Goldstein & Fox P.L.L.C.

[57] ABSTRACT

The present invention is an interprocess communications (IPC) system and method which utilizes shared memory to transfer message contents and a separate, efficient notification mechanism to perform message control functions. The present invention supports robust, asynchronous communications between potentially large number of software application processes residing on any single or tightly-coupled multiple processor arrangement supporting shared memory between the processes. The present invention is a combination of existing IPC mechanisms available in most commercially available UNIX operating systems. The IPC mechanism utilizes the presently available UNIX shared memory IPC mechanism for transferring message contents and the presently available UNIX datagram socket IPC mechanism for message control and notification. The IPC mechanism may be adapted to other operating system environments. The IPC mechanism performs a controlled shutdown of the interprocess communications associated with a user process which has ceased executing. The shared memory allocated for the IPC mechanism is periodically audited to reclaim lost shared memory blocks due to user process failures.

29 Claims, 10 Drawing Sheets

INTERPROCESS COMMUNICATIONS SYSTEM AND METHOD UTILIZING SHARED MEMORY FOR MESSAGE TRANSFER AND DATAGRAM SOCKETS FOR MESSAGE CONTROL

BACKGROUND OF THE INVENTION

1. Field of the Invention

The present invention relates generally to interprocess communications and, more particularly, to an interprocess communications system utilizing shared memory and datagram socket resources.

2. Related Art

The UNIX system has become quite popular since its inception in 1969, implemented on machines of varying, processing power from microprocessors to mainframes and providing a common execution environment across them. The system is divided into two parts: (1) the programs and services which are readily apparent to the user such as the shell, mail, text processing packages, and source code control systems, and (2) the operating system (known as the kernel) that supports these programs and services.

The two more popular and commonly used UNIX systems used today are the AT&T UNIX System V, manufactured by AT&T Bell Laboratories, Murray Hill, N.J., U.S.A., and the Berkeley Software Distribution (BSD) UNIX system, manufactured by University of California at Berkeley, Berkeley, Calif., U.S.A.

Variants of these UNIX systems are available, configured for a specific application or machine. For example, some implementations of the UNIX system interact with a native operating system that, in turn, interacts with the underlying hardware and provides the necessary services to the system. Such configurations allow UNIX installations to run other operating systems and their applications in parallel to the UNIX operating system. Such a configuration includes implementations for the IBM System/370 computers.

UNIX System V and BSD provide Interprocess communication (IPC) mechanisms to allow arbitrary processes to exchange data and synchronize execution. These conventional UNIX IPC mechanisms are inefficient for moderate numbers (more than 6) of asynchronous cooperating processes.

The (byte) stream socket IPC mechanism is the most popular UNIX IPC mechanism. The advantages of the stream socket include high data reliability, high data throughput, and variable message sizes of up to 65,535 bytes. However, these features require a high setup and maintenance overhead, making the stream socket IPC mechanism undesirable for dynamic processes. An additional disadvantage of the stream socket IPC mechanism stems from the nature of the byte stream itself, leaving determination of message boundaries up to the user application program, including resynchronization.

Another conventional UNIX IPC mechanism is the datagram socket IPC mechanism. Advantages of the datagram socket IPC mechanism include low setup and maintenance overhead, high data throughput, and the encapsulation of the message as a packet which is read and written by the application program in its entirety. However, the datagram socket IPC mechanism does not guarantee reliability or message arrival order, leaving these tasks to the user application programs. In addition, the datagram socket limits the size of the messages to 2,048 bytes in length.

A third conventional UNIX IPC mechanism is the use of shared memory. The shared memory IPC mechanism represents the simplest conceptual model of the UNIX IPC mechanisms. Shared memory IPC mechanisms include a very high data throughput, effectively equivalent to a memory-to-memory copy. Additionally, message size is only limited by the amount of shared memory allocated and available (a system imposed limitation), and data reliability is high. The most notable disadvantage of this IPC mechanism is that there is no asynchronous notification mechanism for the receiving user process. Hence, instead of the receiving process being notified of a message, it must periodically access shared memory to detect a message.

None of these conventional IPC mechanisms have the capability to support moderate numbers of asynchronous, cooperating processes, each supporting a moderate number of variable-sized messages (perhaps greater than 65,535 bytes) in a manner transparent to the cooperating user processes. What is needed is an IPC mechanism which provides very high data throughput and reliability for variable-sized messages. The IPC mechanism should have low setup and maintenance overhead in order to support communications between potentially large numbers of both static and dynamic processes. Implementation of the IPC mechanism should require little or no modification to the host operating system.

SUMMARY OF THE INVENTION

The present invention is an interprocess communications (IPC) system and method which utilizes shared memory to transfer message contents and a separate, efficient notification mechanism to perform message control functions. The present invention supports robust, asynchronous communications between potentially large number of software application processes residing on any single or tightly-coupled multiple processor arrangement supporting shared memory between the processes. The present invention requires low setup and maintenance overhead, making it suitable for both static and dynamic processes. The IPC mechanism of the present invention requires no operating system modifications to implement and is easily tunable to adapt to different software system performance criteria.

The preferred embodiment of the present invention is a combination of existing IPC mechanisms available in most commercially available UNIX operating systems. The IPC mechanism utilizes the presently available UNIX shared memory IPC mechanism for transferring message content and the presently available UNIX datagram socket IPC mechanism for performing message control and notification functions. The use of shared memory enables the IPC mechanism to support multiple message sizes, and provides efficient data transfer overhead. The use of datagram sockets for only message notification decreases the typical reliance on the datagram socket IPC mechanism, thereby increasing the reliability of the message transfer. The present invention may be adapted to other operating system environments.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

I. System Overview

Figure 1:
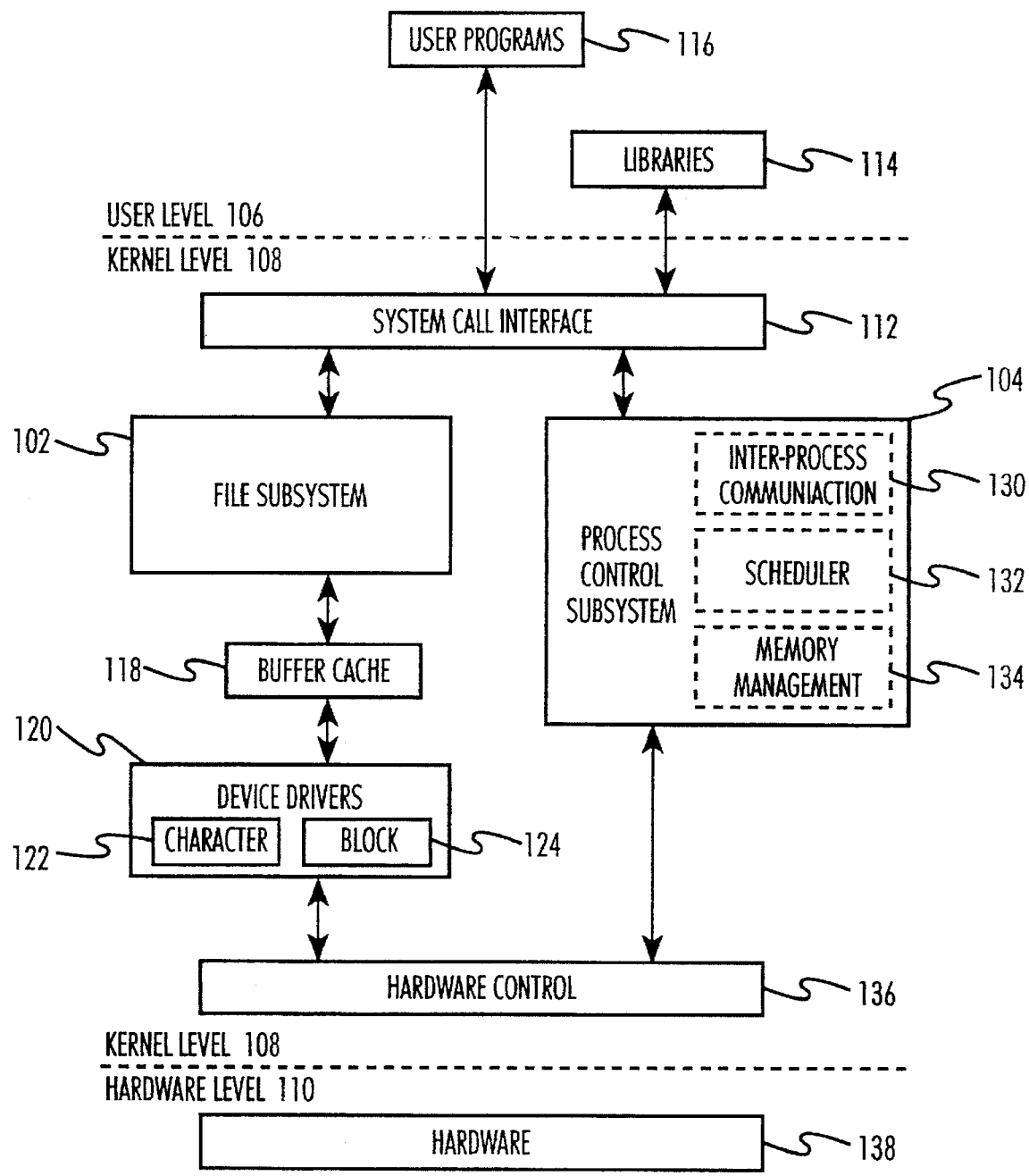
FIG. 1 is a system block diagram of a typical UNIX system.

FIG. 1 is a block diagram of the UNIX system kernel, showing various modules and their relationships to each other. In particular, FIG. 1 shows the file subsystem 102 and the process control subsystem 104, the two major components of the Unix system kernel 108. FIG. 1 serves as a useful logical view of UNIX system, although in practice the kernel deviates from the model because some modules interact with the internal operations of others.

FIG. 1 shows three levels of system 100: user level 106, kernel level 108, and hardware level 110. The system call interface 112 and library interface 114 represent the border between user programs 116 and the kernel 100. System calls look like ordinary function calls in C programs, and libraries map these function calls to the primitives needed to enter the operating system. However, assembly language programs may be used to invoke system calls directly without a system call library. Programs frequently use other libraries such as the standard I/O library to provide a more sophisticated use of the system calls. The libraries are linked with the programs at compile time and are thus part of the user program.

FIG. 1 partitions the set of system calls into those that interact with the file subsystem 102 and those that interact with the process control subsystem 104. The file subsystem 102 manages files, allocating file space, administering free space, controlling access to files, and retrieving data for users. Processes interact with file subsystem 102 via a specific set of system calls, such as "open" (to open a file for reading or writing), "close," "read," "write," "stat" (query the attributes of a file), "chown" (change the record of who owns the file), and "chmod" (change the access permission of a file).

The file subsystem 102 accesses file data using a buffering mechanism 118 that regulates data flow between the kernel level 108 and secondary storage devices. The buffering mechanism 118 interacts with block I/O device drivers 124 to initiate data transfer to and from kernel 108. Device drivers are the kernel modules that control the operation of peripheral devices. Block I/O devices 124 are random access storage devices or, in the alternative, their device drivers make them appear to be random access storage devices to the rest of system 100. For example, a tape driver may allow kernel 108 to read a tape unit as a random access storage device. The file subsystem 102 also interacts directly with "raw" I/O device drivers without the intervention of buffering mechanism 118. Raw devices, sometimes called character device drivers 122, include all devices that are not block device drivers 124. Most block devices 124 also provide a character device-type interface to allow bypassing kernel 100 buffer cache 118. This is referred to as "raw I/O" to a block device. The sum of character devices 122 and block I/O devices 124 constitute device drivers 120.

The process control subsystem 104 is responsible for process synchronization, interprocess communication 132, memory management 134, and process scheduling 132. The file subsystem 102 and the process control subsystem 104 interact when loading a file into memory for execution, the process subsystem 104 reading executable files into memory before executing them.

Some of the system calls for controlling processes are "fork" (create a new process), "exec" (overlay the image of a program onto the running process), "exit" (finish executing a process), "wait" (synchronize process execution with the "exit" of a previously "fork"ed process), "brk" (control the size of memory allocated to a process), and "signal" (control process response to extraordinary events).

The memory management module 134 controls the allocation of memory. If at any time the system does not have enough physical memory for all processes, the kernel 108 moves them between main memory and secondary memory so that all processes get a fair chance to execute. There are generally two policies for managing memory: swapping and demand paging. The swapper process is sometimes called the scheduler 132, because it "schedules" the allocation of memory for processes and influences the operation of the CPU scheduler.

The scheduler module 132 allocates the CPU to processes. It schedules them to run in turn until they voluntarily relinquish the CPU while awaiting a resource or until the kernel preempts them when their recent run time exceeds a time quantum. The scheduler 132 then chooses the highest priority eligible process to run; the original process will run again when it is the highest priority eligible process available. There are several forms of interprocess communication 130, ranging from asynchronous signaling of events to synchronous transmission of messages between processes.

Finally, the hardware control 136 is responsible for handling interrupts and for communicating with hardware 138. Devices such as disks or terminals may interrupt the CPU while a process is executing. If so, the kernel may resume execution of the interrupted process after servicing the interrupt: Interrupts are not serviced by special processes but by special functions in the kernel, called in the context of the currently running process.

II. IPC Send Message Data Process

Figure 2:
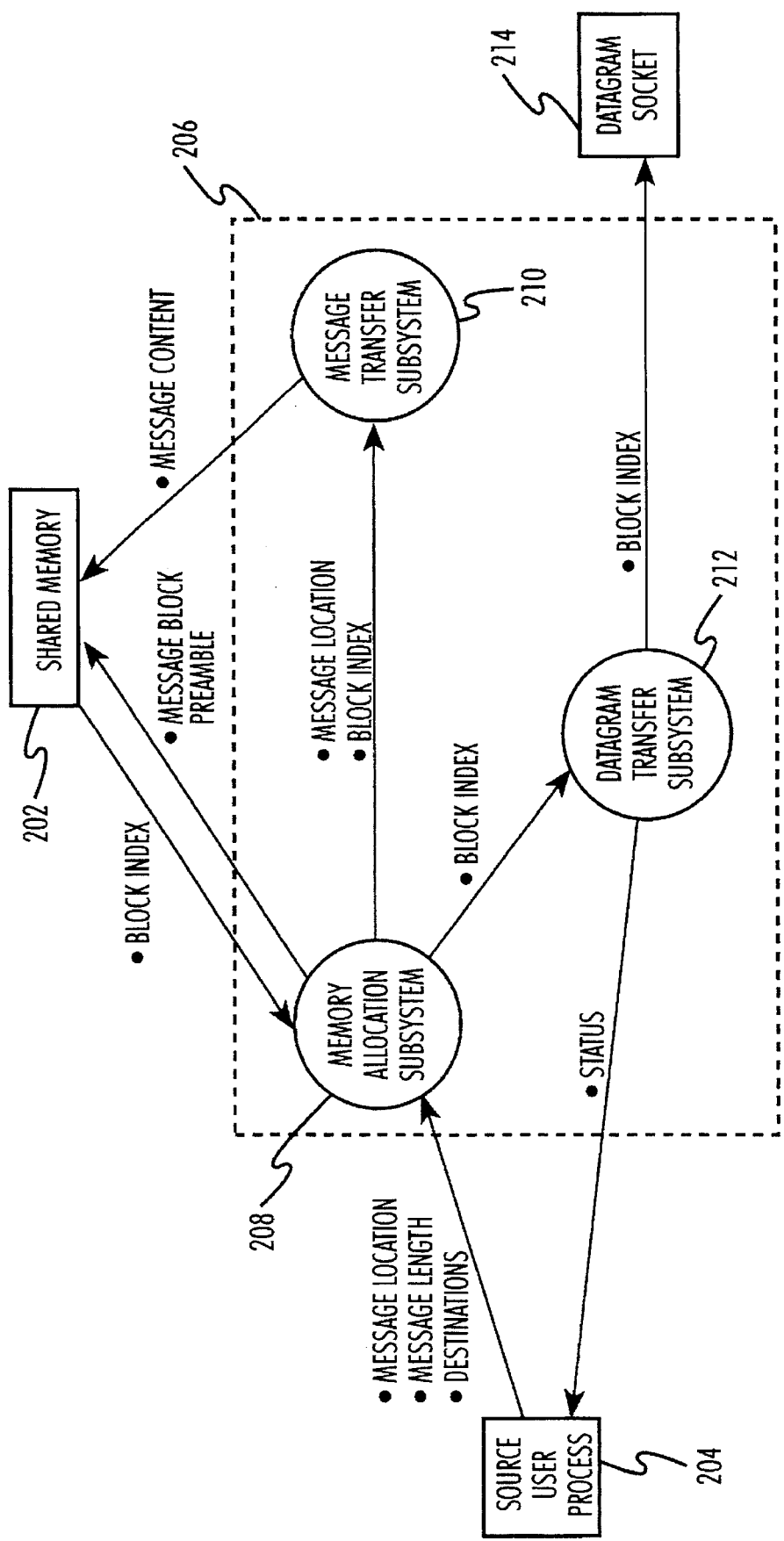
FIG. 2 is a block diagram of the IPC mechanism of the present invention performing a message origination function.

Referring to FIG. 2, a block diagram of the data flow for message origination using the IPC mechanism of the present invention is illustrated. The IPC mechanism 206 is comprised of three main subsystems: memory allocation subsystem 208, message transfer subsystem 210, and datagram transfer subsystem 212. Each of these will be described below with reference to message origination.

In the preferred embodiment of the present invention, shared memory 202 is the IPC mechanism used to transport the message contents while datagram socket 214 is the IPC mechanism used to transfer message notification information. Since the actual structure of shared memory 202 is at the discretion of the cooperating user processes, as a message transport mechanism, shared memory 202 provides no constraints on the individual message size and structure other than the system imposed maximum shared memory allocated for use.

When a source user process 204, also referred to as the requesting user process, is required to send a message to one or more destination processes, the source user process 204 sends three items to IPC mechanism 206. The requesting user process 204 sends the location of the message in the source user process local memory ("message location"), the message length, and the identity of the desired destination user process(es) ("destinations"). This is the standard information which is provided by a source user process when such a user process is to send a message to a destination user process in a Unix operating system environment.

The memory allocation subsystem 208 receives the above data items from source user process 204, indicating to IPC mechanism 206 that source user process 204 is requesting to send data to one or more destination user processes. When such a notification is received, IPC mechanism 206 performs three functions: (1) allocate the necessary shared memory; (2) transfer the message data to shared memory; and (3) place the message control data in the datagram socket. Each of these functions are further discussed below.

First, memory allocation subsystem 208 allocates a shared memory block from shared memory 202 to transfer the message contents. The preferred embodiment of the present invention is implemented in a UNIX System V computer system and uses the standard UNIX system calls for manipulating shared memory. The IPC mechanism 206 invokes UNIX system calls to attach to a shared memory segment (discussed below) prior to the memory allocation subsystem 208 allocating a shared memory block for this particular message transfer.

When the memory allocation subsystem 208 allocates a shared memory block, it locks access to the shared memory block and updates the preamble to indicate the status of that block as being in-use, the current time, the allocating process ID, and the number of receivers that are to receive the message block ("message block preamble"). The allocated shared memory block is of sufficient size to accommodate a message of the size indicated in message length information received from the source user process 204. The location of this message block in shared memory is identified by a shared memory block index ("block index").

The message allocation subsystem 208 then sends the local memory address ("message location") of the message data and the shared memory block index to the message transfer subsystem 210.

Next, the message transfer subsystem 210 transfers the message ("message content") into the allocated shared memory block by taking the message contents located at the designated local memory address and placing it into the shared memory location designated by the shared memory block index. The message transfer is performed at the speed of the processor, and does not require any additional overhead once the shared memory block has been acquired (discussed further below).

Lastly, the memory allocation subsystem 208 sends the datagram transfer subsystem 212 the shared memory block index which now indicates the shared memory location which contains the message contents. The datagram transfer subsystem 212 then places the shared memory block index into the standard UNIX datagram socket 214 once for each receiving process. Once the shared memory block index has been placed into datagram socket 214, the message transfer process is completed. The transmission of the shared memory block index to the datagram socket 214 represents the success or failure of the message transmission. The status of this datagram transmission is then returned to the source user process 204.

Since the processes which use the datagram socket 214 have to perform their own verification procedures, using datagram socket 214 to transfer only the shared memory block index rather than entire message reduces the potential impact of datagram socket errors from interfering with the message transfer. UNIX systems typically accommodate (at least) 2048 (8-bit) bytes of received data on a datagram socket before data loss is encountered. The shared memory block index is typically a 16-bit integer. Given this, the present invention allows for 1,024 (16-bit) mess, ages outstanding to any single receiver processed without experiencing data loss.

III. IPC Receive Data Process

Figure 3:
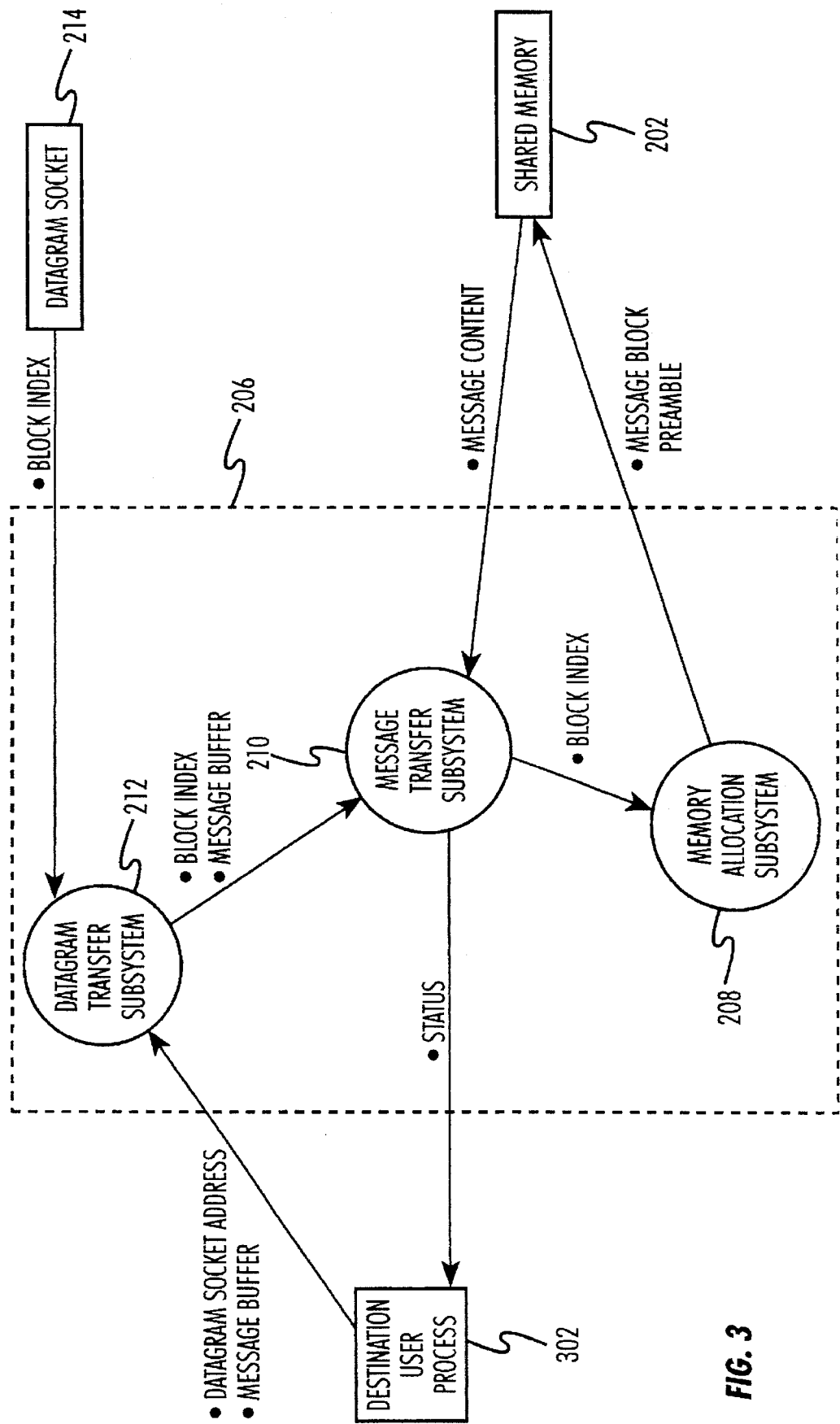
FIG. 3 is a block diagram of the IPC mechanism of the present invention performing a message reception function.

Referring to FIG. 3, a block diagram of the data flow for message reception using the IPC mechanism of the present invention is illustrated. In the preferred embodiment of the present invention, when a destination user process 302 is to receive a message, standard UNIX operating system features provide the mechanism by which the user process is notified of the message arrival. The use of these operating features eliminates the need to consume processor time polling for message arrival.

Typically, the destination user process 302 is pending on a "read" system call on its datagram socket. This enables destination user process 302 to be suspended by the operating system while it is waiting for a message(s) to act upon. It is also possible for destination user process 302 to be notified asynchronously via a UNIX "signal" system call when a message is required to be received.

As described above, the present invention transmits only the shared memory block index via datagram socket 214. Therefore, only a relatively small (2 byte), fixed-length "read" is required. The standard UNIX datagram model guarantees that the shared memory block index is received completely, or not at all. In either case, when the destination user process 302 is to receive a message via its datagram socket 214, it sends the datagram socket address ("datagram socket address") and the local memory address ("memory address") which is to receive the message contents to IPC mechanism 206. When IPC mechanism 206 receives the datagram socket and local memory addresses, it performs three main functions to achieve message reception: (1) transfer the shared memory block index from the datagram socket to the destination user process; (2) transfer the message contents located in the designated shared memory block to the designated local memory location; and (3) decrement the shared memory block preamble receiver count by one, and if it is now zero, "unlock" or release the shared memory block previously containing the message contents for future use. Each of these functions are further described below.

First, the datagram transfer subsystem 212 receives the datagram socket address and local memory address from the destination user process 302. The datagram transfer subsystem 212 then retrieves the shared memory block index from datagram socket 214 which is located at the datagram socket address. The shared memory block index indicates the shared memory location (i.e., the shared memory block) which contains the message contents to be transferred. The shared memory block index is then transferred to the message transfer subsystem 210 along with the local memory address of destination user process 302. The message transfer subsystem 210 then transfers the message contents at the speed of the processor from the designated shared memory block to the designated local memory address. The message transfer subsystem 210 then transfers the shared memory block index to the memory allocation subsystem 208.

Upon receipt of the shared memory block index, the memory allocation subsystem 208 decrements by one the receiver count field of the message block preamble, and if it is now zero, makes the shared memory block available for re-use by any other cooperating user process. This is accomplished by updating a status indicator in the preamble of the message block (discussed below). The message transfer subsystem 210 then transmit status to the destination user process 302 indicating the success or failure of the message transfer.

IV. System IPC Setup

Figure 4:
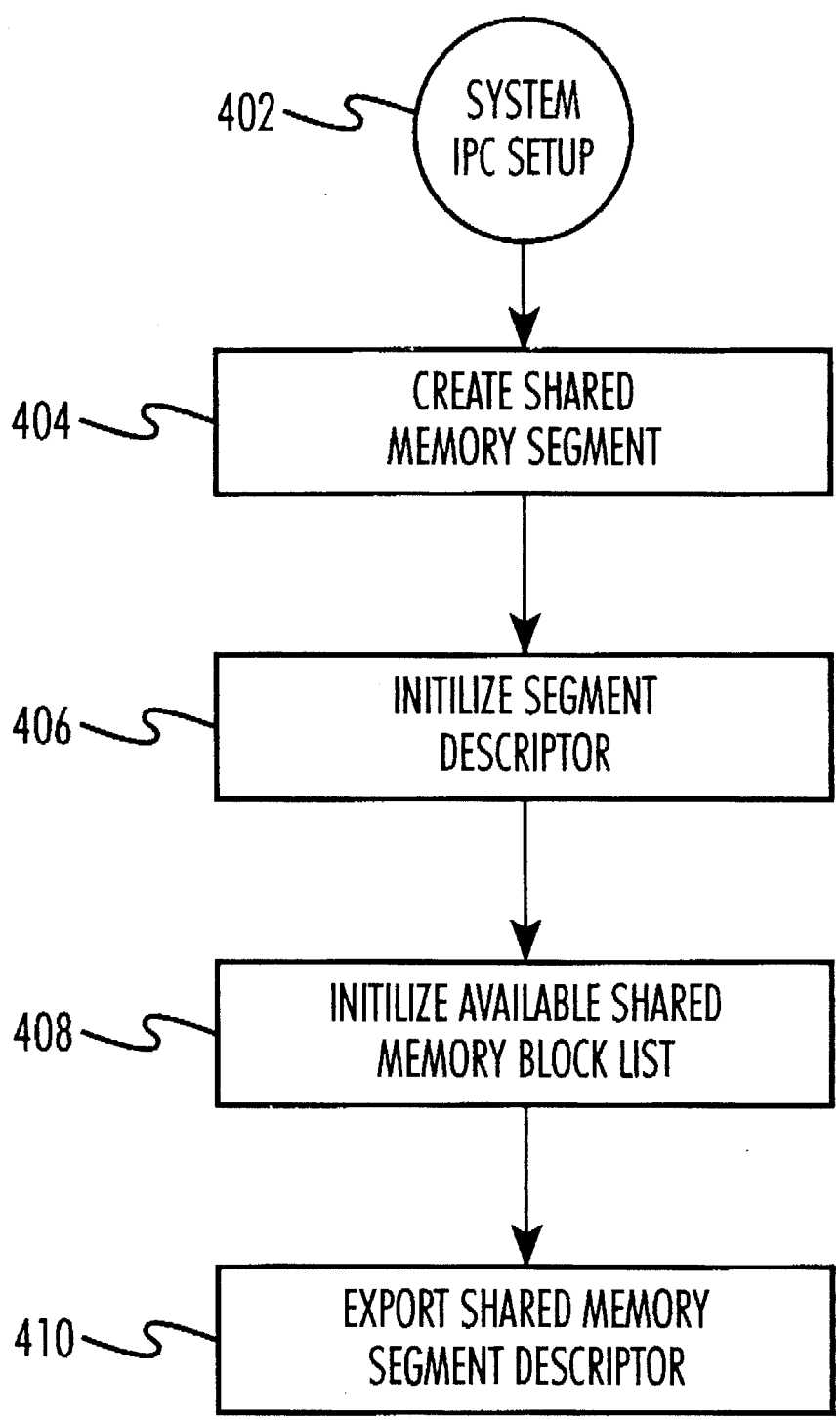
FIG. 4 is a flowchart illustrating the functional steps which are necessary to set up the operating system resources prior to making the IPC mechanism of the present invention available to the cooperating user processes.
Figure 5:
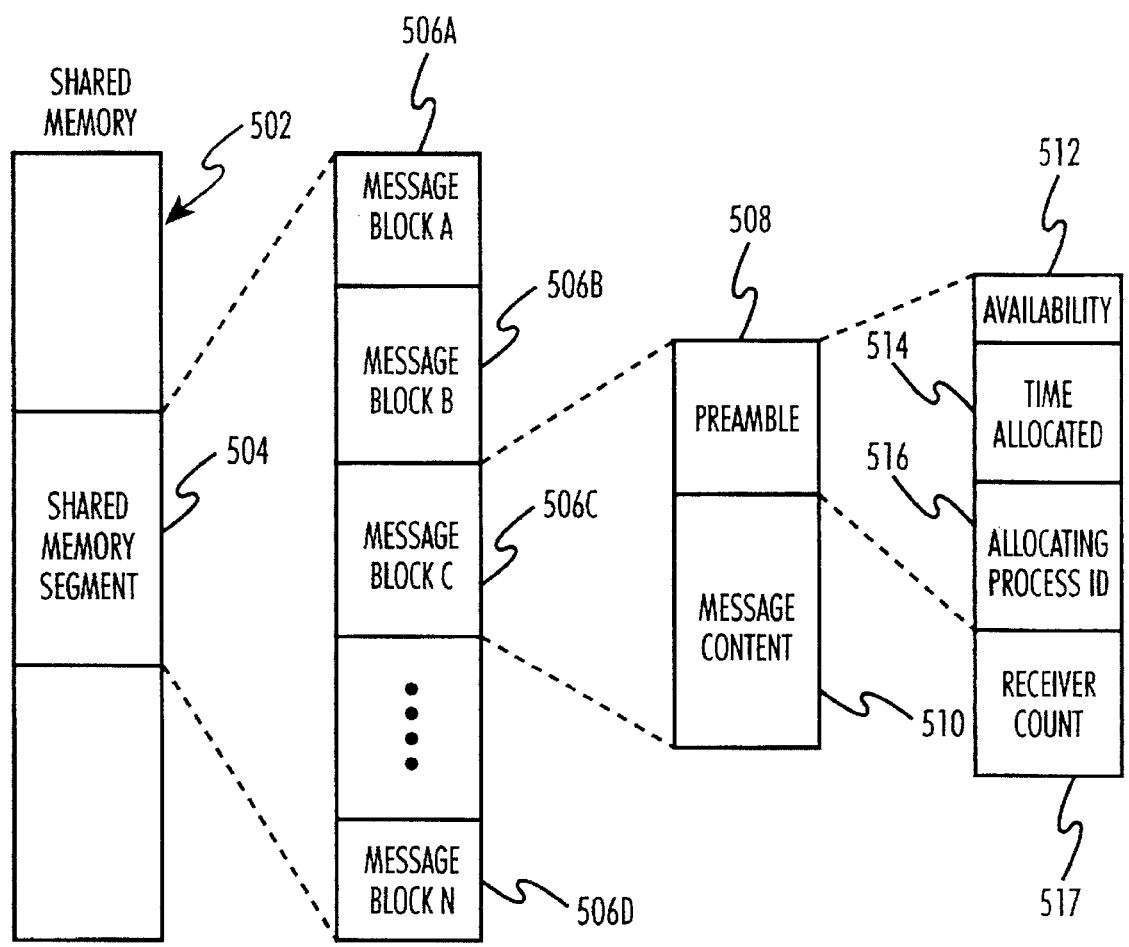
FIG. 5 is a block diagram of the shared memory resources in a UNIX system environment.

Referring to FIG. 4, a flowchart of the steps performed by the UNIX operating system and the IPC mechanism of the present invention to create and initialize shared memory are illustrated. FIG. 5 is a block diagram illustrating how shared memory segments are partitioned during the process depicted in FIG. 4.

The steps performed to allocate and initialize shared memory 202 for the present invention is referred to as System IPC Setup 402. Prior to use by any of the cooperating user processes, the shared memory used to transport messages, referred to as shared memory segment 504 of shared memory 502, must be allocated from the UNIX operating system, step 404. This is typically accomplished at system start-up by an initialization process, sometimes referred to as a dameon. The UNIX system call "shmget" is used to create the shared memory segment 504. However, as one of ordinary skill in the relevant art would know, any method other than the standard UNIX shared memory allocation method may be used. In the preferred embodiment of the present invention wherein the initialization process performs the shared memory allocation, the initialization process then remains resident to monitor related user application processes.

At step 406, a segment descriptor is created. The segment descriptor identifies the shared memory segment which has been allocated. The segment descriptor enables user processes to attach to and access the allocated shared memory segment. This access mechanism, which is utilized in the preferred embodiment of the present invention, is part of the standard UNIX shared memory application program interface. However, any means which is available to shared memory may be used.

Next, in step 408, the shared memory segment 504 is sub-divided into individual message blocks 506A through 506D (collectively and generally referred to as 506) by the IPC mechanism. Whether this is a single memory block list of equal-sized blocks or several memory block lists of different-sized blocks is determined by the creator of the application designer. The present invention does not determine how the shared memory segment 504 is allocated into message blocks 506. Therefore, the overhead to manage the shared memory segment only increases slightly as more block sizes are defined.

Each shared memory message block 506, regardless of size classification, contains a preamble 508 which is separate from the message content portion 510 of the message block. The preamble 508 is used, at a minimum, to track the availability of the associated message block 506. This message block availability 512 indicates whether the message block 506 has been allocated. If the message block 506 has been allocated, the preamble 508 contains the time the block was allocated in UNIX time form 514, and an identifier indicating the user process which allocated the message block 516. In the preferred embodiment of the present invention, the identifier is a UNIX-supplied process ID. However, any process identification scheme may be used. The block availability 512 is used during the shared memory block allocation process as described above.

Preamble 508 also has a receiver count 517 which contains the number of destination user processes which are to receive the associated message block 506. Receive count 517 therefore enables the source user process to broadcast a message to multiple destination processes using a single message block 506. The other fields of preamble 508 are used to reclaim "lost" message blocks 506. Message blocks 506 may be lost due to either a system failure to deliver the associated datagram (shared memory block index) or a user application process failure (discussed below).

Lastly, in step 410, the shared memory segment descriptor created at step 406 is then made available to cooperating user processes. This is typically done either by assigning a well-known identifier at the source program level, which is simply compiled into each user process, or it is passed as input by the initialization process as it creates each user process (either as a command-line argument or as an environment variable).

V. User IPC Setup

Figure 6:
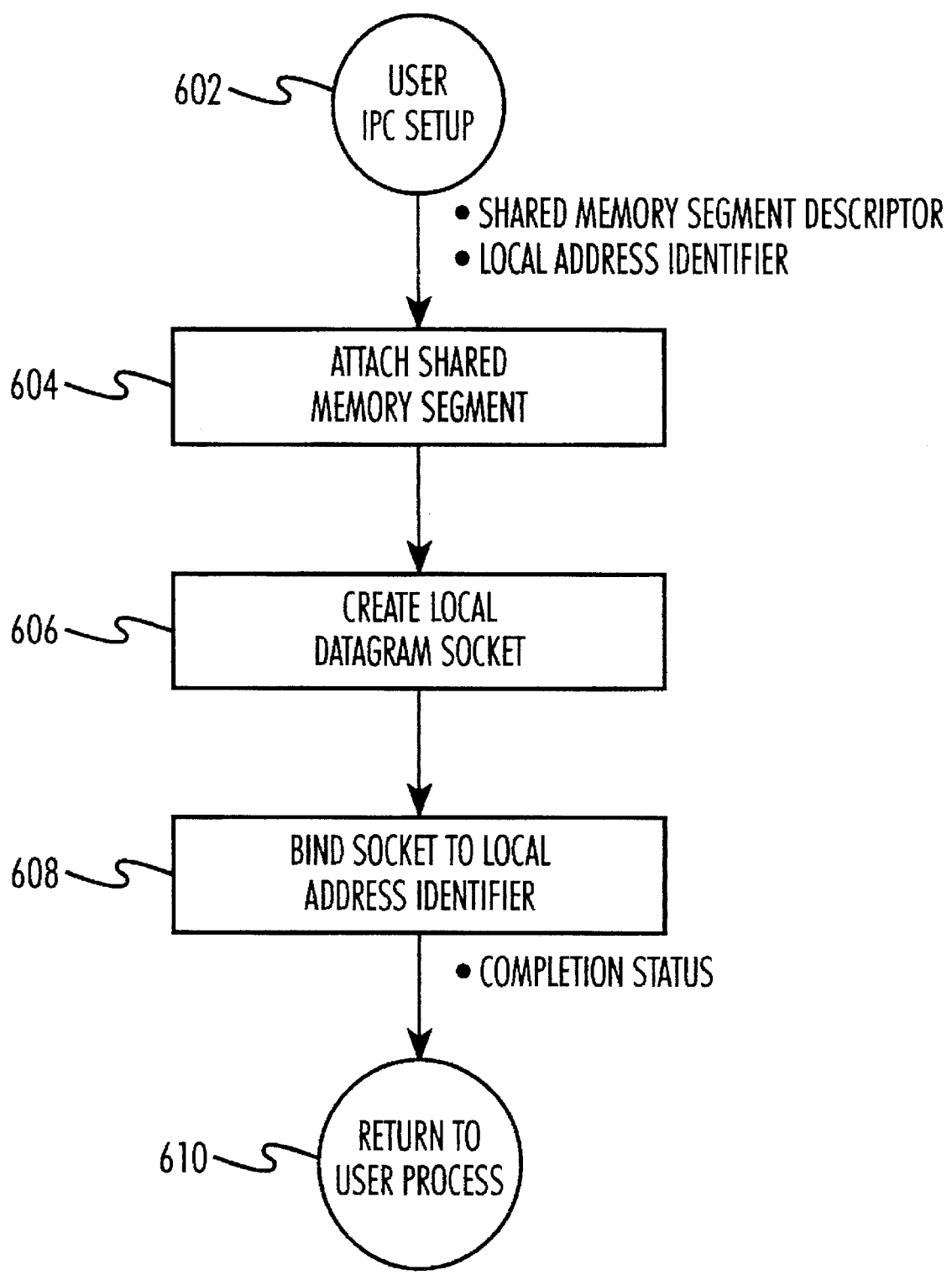
FIG. 6 is a flowchart illustrating the necessary steps to set up a user process prior to that process's use of the IPC mechanism of the present invention.

For cooperating user processes to utilize the IPC mechanism of the present invention, the user process has to perform a one-time initialization sequence. This is typically performed when the user process first starts executing. However, it may be performed at any time before the user process is to send or receive messages via IPC mechanism 206. In the preferred embodiment of the present invention, the sequence shown in FIG. 6 is performed by making three separate UNIX system calls. This is as a user-callable subroutine requiring two input parameters (discussed below) and outputting a completion status. However, other means may be used to initialize the cooperating user processes to utilize the IPC mechanism.

When a user process is required to use IPC mechanism 206, it first provides the shared memory segment descriptor and a datagram socket identifier to IPC mechanism 206. As described above, the segment descriptor identifies the shared memory segment which has been allocated, and enables the user processes to access the shared memory segment. The shared memory segment descriptor was made available to the user process via the chosen export method discussed above with reference to FIG. 4, step 410. In the preferred embodiment of the present invention, the datagram socket identifier is an ASCII string identifying a local address. However, as one of ordinary skill in the relevant art would know, the datagram socket identifier may be any desired bit string. These are used in the UNIX "bind" system call when creating the local datagram socket, step 602.

Using the shared memory segment descriptor, the user process attaches to the shared memory segment 504 with the UNIX "shmat" system call in step 604, allowing the shared memory to be accessed directly by the user process. In step 606, a local datagram socket is created via the UNIX "socket" system call. After the datagram socket is created, the local address identifier is attached to the datagram socket with a UNIX "bind" system call in step 608. The user application process then receives a completion status indicating the success or failure of these actions.

VI. IPC Send Message Process

Figure 7:
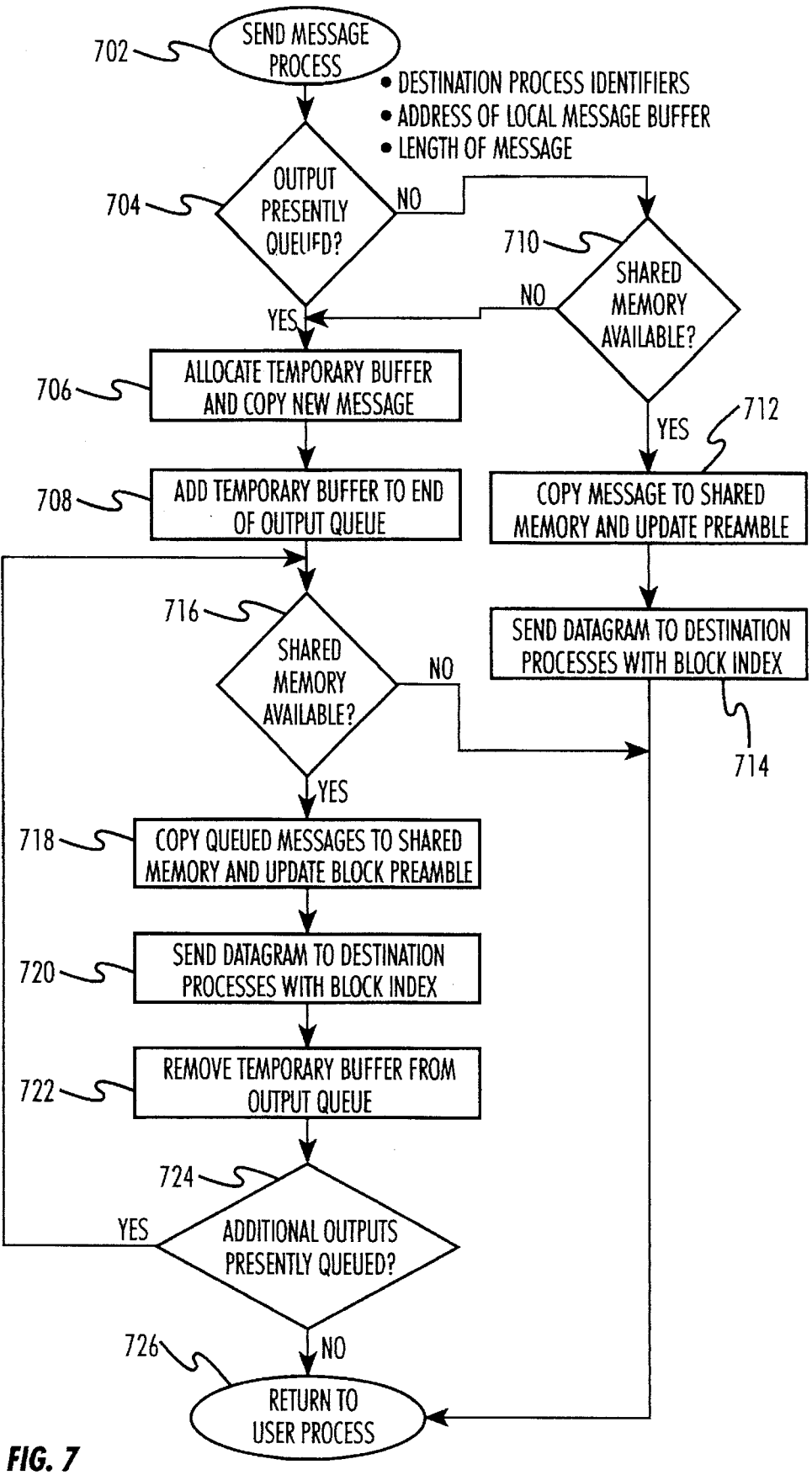
FIG. 7 is a flowchart illustrating the functional steps which are necessary to send a message to a destination user process via the IPC mechanism.

After the requesting source user process 204 attaches to the shared memory segment and associates the local datagram socket with a local address identifier, the user process may then send a message using the IPC mechanism of the present invention. Referring to FIG. 7, the process to send a message via IPC mechanism 206 is illustrated. This is referred to as the Send Message Process 702 of the present invention. One of the advantages of the present invention is that it insures that the Send Message Process 702 is normally non-blocking to the requesting user process. This is necessary to prevent a circular deadlock condition due to one or more user processes attempting to allocate a shared memory block when none are available, while simultaneously, input messages are pending which, when processed, will make those same shared memory blocks available. Since the number of shared memory blocks are typically determined at initialization time, the system will normally not recover from such a circular deadlock condition. The IPC Send Message Process prevents such a condition from occurring.

The present invention avoids this situation by returning a successful completion indication in response to the requesting source user processes' request to send messages, when in fact, the message is still resident in local memory awaiting shared memory resources to complete the actual message transmission. To accomplish this, a local memory queue of pending output messages is maintained for each source user process 204. In order to perform the function of message queuing transparently to the requesting source user process, the message content is copied to a dynamically allocatable local memory store which is enqueued, so that the requesting user process is free to reuse the originating message buffer in local memory.

This approach is more desirable than explicitly creating a local message save area and providing a "local message save area allocation" function. Such a function is limited by the predetermined message save area size, which would create undesirable error conditions when the memory space was full. Enqueing dynamically allocatable local memory areas avoids this condition by giving the appearance of almost infinite memory resources.

When a requesting source user process 204 is required to send a message to one or more destination processes, IPC mechanism 206 performs the process illustrated in FIG. 7. When a new request to send a message is received, IPC mechanism 206 first determines if there are any previous messages which are already waiting for shared memory resources to complete their respective transmission sequence, step 704.

When the output queue is not empty, there are messages which are presently awaiting for shared memory resources. When this is the case, the new message is then enqueued in the order in which it was received to guarantee that the messages are processed in the order in which the source user processes' attempt to transmit them. To accomplish this, a dynamic, temporary memory buffer is allocated via the UNIX "malloc" system call, step 706. In the preferred embodiment of the present invention, the UNIX "malloc" system call is used to take advantage of the UNIX virtual memory management capabilities. However, any method for creating dynamically allocatable temporary buffers may be used. The message data is then copied in step 708 from the user process local message buffer to this dynamically allocated temporary buffer. The temporary buffer is then enqueued at the end of the output queue, so that the messages are transmitted in the order received.

If, in step 704, the IPC mechanism determines that there are no messages presently awaiting shared memory resources (the output queue is empty), then an attempt is made to allocate a shared memory block of sufficient size to accommodate the message size requested, step 710. To synchronize access to the shared segment and avoid contention from multiple processes, a shared memory semaphore is used in the preferred embodiment of the present invention. The semaphore is only held (that is, prevents the other user processes from having access) long enough to mark the message block as in-use. As one of ordinary skill in the art will know, the "semop" system call is a standard UNIX capability which enables processes to synchronize access to the shared memory segment when attempting to allocate a message block. For further discussion on the use of semaphores, see M. Bach, "The design of The UNIX Operating System," Prentice Hall, Inc., 1986, herein incorporated by reference in its entirety.

If, in step 710, the IPC mechanism determines that there are no shared memory blocks presently available, the new message is then added to the pending output queue as previously described with reference to steps 706 and 708. If a shared memory block of sufficient size is available, then the contents of the local message buffer are copied into the shared memory block. In step 712, the shared memory block preamble is updated to indicate that the shared memory block is in use, the time that this allocation occurred, and the unique process identifier of user process 204.

Once the message contents have been placed into a shared memory block, the shared memory block index associated with the particular shared memory block is sent to the destination process(es) datagram socket(s) via the UNIX "write" system call, step 714. After the datagram has been sent to the destination processes, control is returned to the calling user process in step 726.

If the current message was enqueued on the pending-output queue at step 708, an attempt is made to send the (oldest) message enqueued at the head of the pending-output queue.

In step 718, an attempt is made to allocate a shared memory block of sufficient size to accommodate the message size requested. To avoid contention from multiple processes, a shared memory semaphore is used as described above. If no shared memory blocks are presently available, step 716, the new message is left enqueued, and control is returned to calling user process 702, step 724. If a shared memory block of sufficient size is available, the contents of the local message buffer are copied into the shared memory block and the shared memory block's preamble is updated to indicate that the shared memory block is in use, the time that this allocation has occurred, and the unique process identifier of user process 204, step 718.

Once the message content has been placed into a shared memory block, the index associated with the shared memory block is sent to the destination process(es) datagram socket (s) via the UNIX "write" system call in step 720. Next, in step 722, the temporary buffer containing the message just sent is de-enqueued from the output-pending queue and the allocated memory area is released via the UNIX "free" system call.

If it is determined that additional messages remain enqueued in the pending output queue, step 724, the previous sequence of steps is repeated from the point of attempting to allocate a shared memory block at step 716. If there are no other messages presently pending, then control is returned to the requesting user process 204, step 726.

VII. IPC Retrieve Message Process

Figure 8:
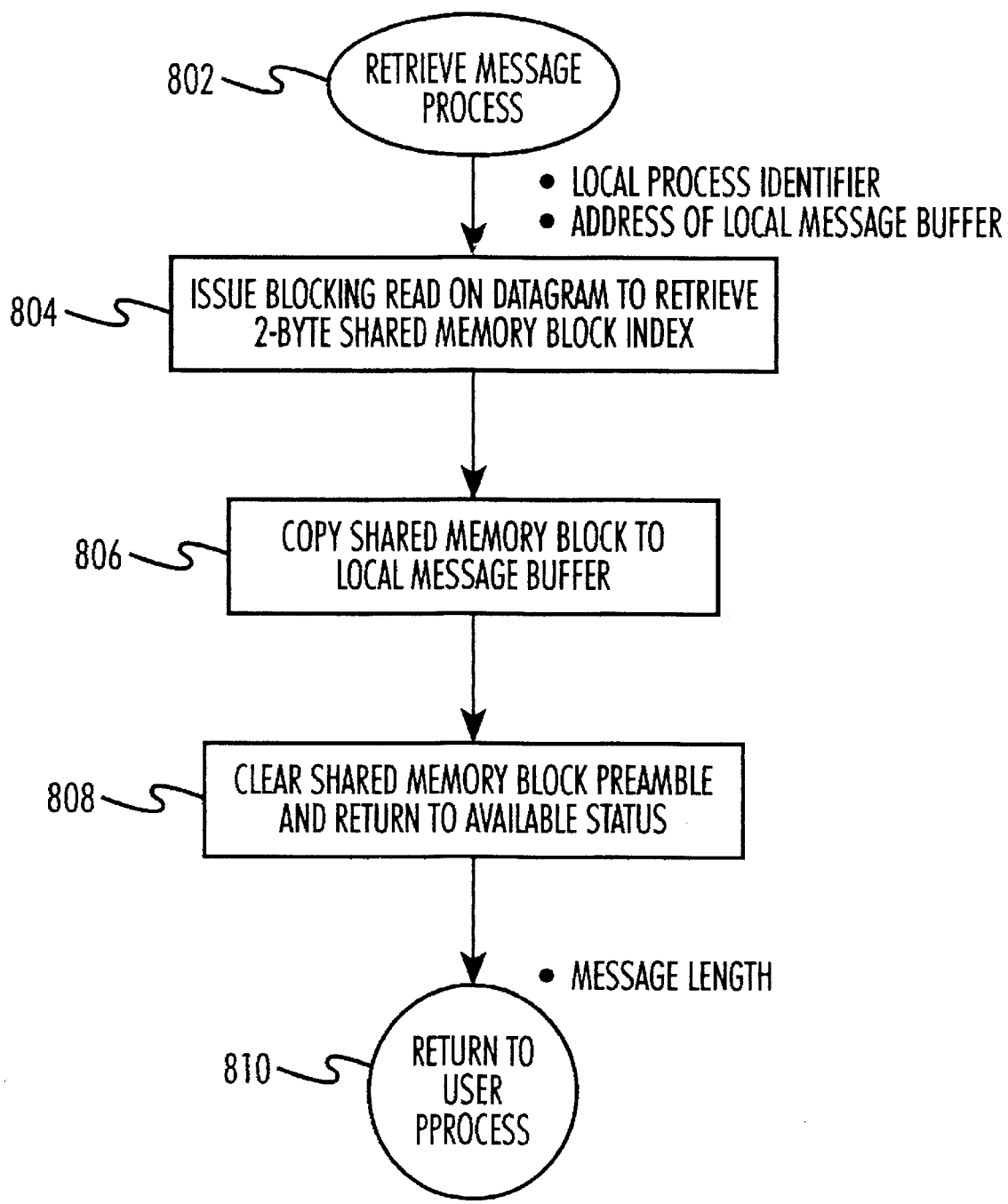
FIG. 8 is a flowchart of the functional steps necessary for a cooperating user process to receive a message from any originating user process, including itself, via the IPC mechanism.
Figure 9:
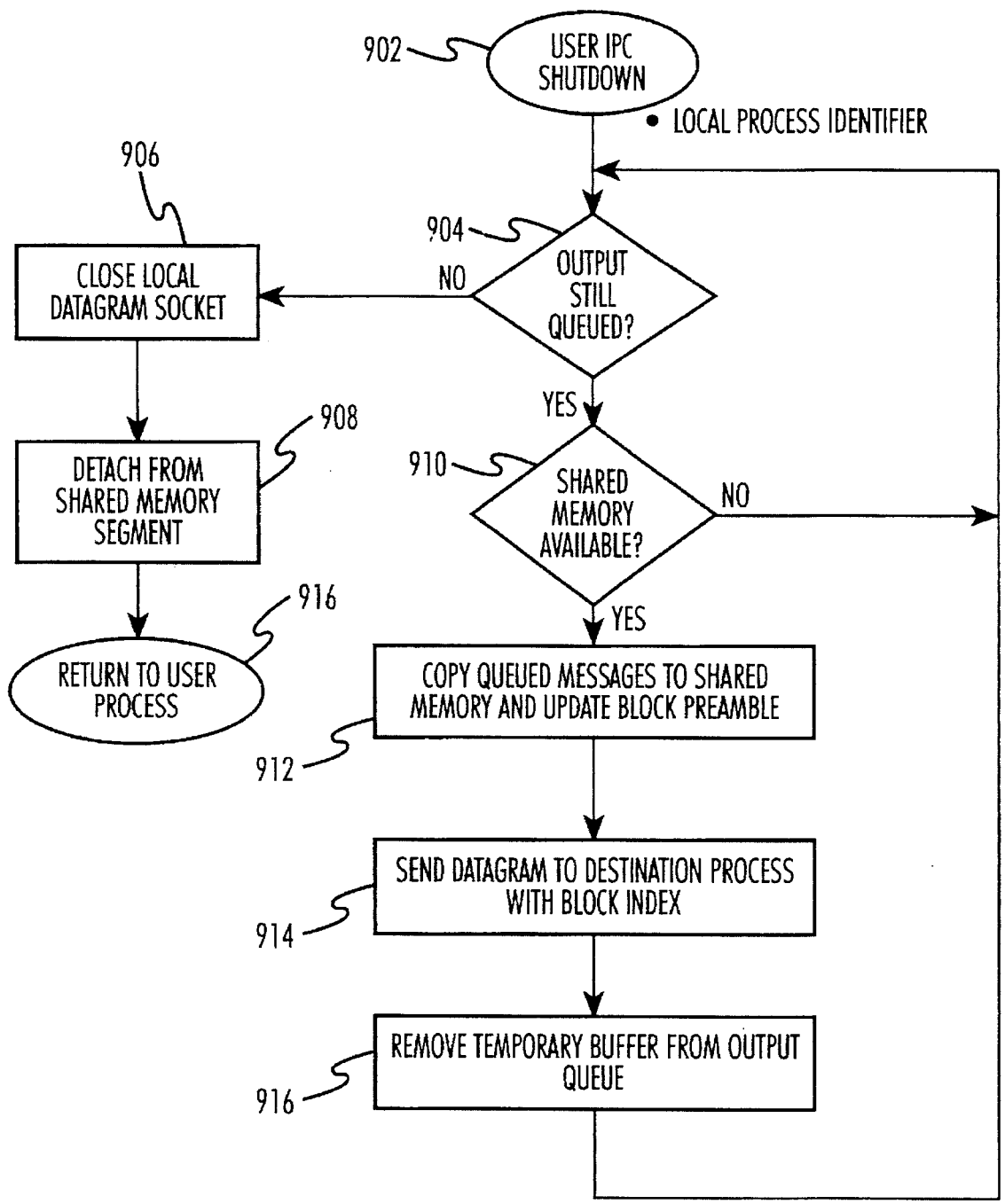
FIG. 9 is a flowchart of the functional steps which are necessary for a user process to disconnect itself cleanly from its association with the IPC mechanism.

After the requesting source user process 204 attaches to the shared memory segment and associates the local datagram socket with a local address identifier, the user process may then receive a message using the IPC mechanism of the present invention. Referring to FIG. 8, the process to receive a message via IPC mechanism 206 is illustrated. This is referred to as the Receive Message Process 702 of the present invention.

When a destination user process 302 is required to receive a message, it typically issues a blocking UNIX "read" system call on the local datagram socket. This capability allows destination user process 302 to be suspended by that operating system until the arrival of a message requiring some type of service by the user process. When a message arrives, the operating system then resumes execution of destination user process 302 and returns the datagram message containing a shared memory block index, step 804.

Next, step 806 is performed, wherein the contents of the shared memory block are then copied to the user-supplied local message buffer. The shared memory block preamble receiver count field is decremented by one, and if now zero, the shared memory block is available for re-use. If the receiver count is still greater than zero after being decremented, then all intended destinations have not yet "received" the message, and the shared memory block is left as in-use.

Once the share memory block preamble has been updated, control is then returned to the destination user process with the length of the message which has been retrieved, step 810.

VIII. User IPC Shutdown

When a user process is to cease running, the present invention enables a controlled shutdown of the interprocess communications associated with that user process. This is to guarantee that any messages which are left on the pending-output queue associated with that user process are removed before the user process terminates. This feature of the invention maintains the integrity of the cooperating user processes.

When the user process calls the IPC mechanism of the present invention in step 902, the IPC mechanism 206 first determines if there are any output messages which are still on the pending output queue in step 904. If there are no messages remaining on the pending output queue, the local datagram socket is then destroyed in step 906 via the UNIX "close" system call. The user process then detaches itself from the shared memory segment in step 908. Once the user process is no longer attached to the shared memory segment, control is then returned to the calling user process in step 916.

If at step 904 there are additional messages which are still on the pending output queue, an attempt is made to allocate a shared memory block of sufficient size to accommodate the message, step 910. To avoid contention with multiple processes, a shared memory semaphore is utilized as describe above.

If it is determined that no shared memory blocks are presently available in step 910, the pending output queue verification process is repeated until one becomes available for the next pending message. When a shared memory block of sufficient size is available, the contents of the local message buffer are copied into the shared memory block and the shared memory block's preamble is updated to indicate that the shared memory block is in use, the time that this allocation has occurred, and the unique user process identifier in step 912.

Once the message contents have been placed into a shared memory block, the index associated with this shared memory block is sent to the datagram socket of the destination process(es) in step 914 via the UNIX "write" system call.

The temporary buffer containing the message just sent is de-enqueued from the output pending queue and the allocated memory area is then released via the UNIX "free" system call in step 916. The previous sequence is then repeated from step 904, until there are no more messages on the output queue.

IX. Shared Memory Maintenance

The critical resource in the present invention is the availability of shared memory resources. In order to ensure that the present invention is robust over a potentially long period of time, despite possible user process failures which may "strand" shared memory blocks carrying in-transit messages, the present invention includes a facility to audit shared memory blocks in order to reclaim those which have been "lost."

Figure 10:
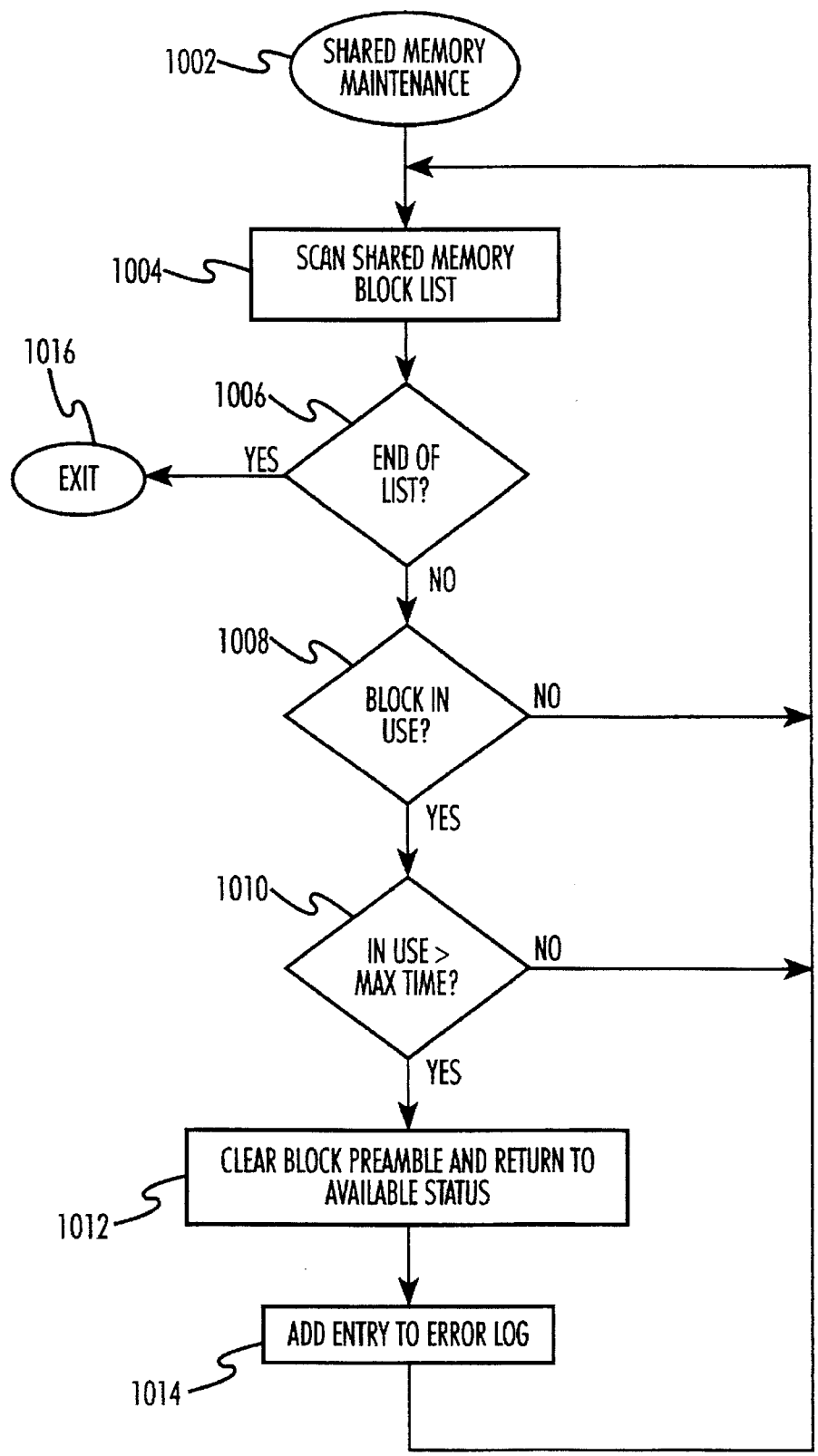
FIG. 10 is a flowchart of the program flow necessary to monitor and maintain the integrity of the IPC mechanism.

In the preferred embodiment of the present invention, the shared memory blocks are audited on a periodic basis by the shared memory maintenance process shown in FIG. 10. The frequency of this periodic shared memory block verification depends on the user processes being supported by this invention, and should therefore be administratable, preferably at run-time. In the preferred embodiment of the present invention, the frequency at which the shared memory blocks are verified is one minute.

When performing the shared memory maintenance 1002, the list of all shared memory blocks is first scanned within the shared memory segment in step 1004. If all shared memory blocks have been scanned, shared memory maintenance is complete for this invocation, step 1006, and the shared memory maintenance routine is exited at step 1016.

If all the shared memory blocks have not been scanned, the present invention then reads the preamble of the shared memory block being examined to determine if the shared memory block is currently in use, step 1008. If the preamble of the shared memory block indicates that it is not currently being used, the previous sequence is repeated for the next shared memory block.

If the preamble of the shared memory block being examined indicates that the shared memory block is currently in use, step 1008, the present invention then determines if the length of time that the shared memory block has been allocated is greater than the application imposed maximum time, step 1010. If the preamble's allocation time indicates that the length of time the shared memory block has been allocated is less than or equal to the user application imposed maximum time, the previous sequence of steps is repeated for the next shared memory block, step 1010.

If the preamble of the shared memory block being examined indicates that the shared memory block is currently in use and the preamble's allocation time indicates that the length of time the shared memory block has been allocated is greater than the user application imposed maximum time, then the shared memory block is made available for reuse, step 1012.

The shared memory block preamble is then updated to indicate that the shared memory block is available for reuse. As long as the preamble is cleared in a sequence such that the in-use indicator is updated last and the in-use indicator update cannot be interrupted or preempted, no shared memory semaphore is needed.

When a shared memory block is made available for reuse, it indicates that a possible user process failure has occurred which caused the shared memory block to be lost. To facilitate the system administrator in determining the cause of this error, an entry is made to a text error log file, step 1014. This entry indicates that a shared memory block was found to be "lost," and has been recovered. All preamble information from the shared memory block is included in the error log to document the apparent failure and support further debug efforts. After the entry is made into the text error log file, the above sequence is repeated for the next shared memory block.

While the invention has been particularly shown and described with reference to preferred embodiments thereof, it will be understood by those skilled in the art that various changes in form and detail may be made therein without departing from the spirit and scope of the invention.

What is claimed is:

1. An interprocess communications system for transferring message data from a source user process to at least one destination user process in a computer-based system providing a Unix operating system environment and a shared memory, the interprocess communications system comprising:

initialization means for creating and initializing a shared memory segment in the shared memory, said shared memory segment including a plurality of message blocks having a preamble portion and a message content portion, said preamble portion having an availability status region, a time allocation region, and an identification region;

sending means for placing the message in one of said plurality of message blocks and for placing a shared memory block index in a datagram socket interprocessor communications mechanism associated with the destination user process, said shared memory block index identifying said one of said plurality of message blocks which contain the message data;

receiving means for receiving said shared memory block index from said datagram socket interprocessor communications mechanism and for using said shared memory block index for retrieving the message data from said one of said plurality of message blocks;

maintenance means for maintaining the availability of said plurality of message blocks in said shared memory segment, said maintenance means periodically reading said time allocation region and comparing the time in said time allocation region with a predetermined value; and shutdown means for performing a controlled shutdown of the interprocessor communications system when the source user process ceases execution, said shutdown means guaranteeing that any messages associated with the source user process are sent to the at least one destination user process before the source user process is terminated.

2. The system of claim 1, wherein said sending means comprises:

first memory allocation means for allocating said one of said plurality of message blocks;

first message transfer means for transferring the message from a local memory location associated with the source user process to said allocated message block, and for placing the message in a temporary buffer when said first memory allocation means cannot allocate said one of said plurality of message blocks which is of sufficient size to store the message data; and first message control transfer means for transferring said shared memory block index to said datagram socket interprocess communications mechanism.

3. The system of claim 2, wherein said receiving means comprises:

second message control transfer means for transferring said shared memory block index from said datagram socket interprocess communications mechanism to the destination user process;

second message transfer means for transferring the message from said allocated message block and from said temporary buffer to a local memory location associated with the destination user process; and second memory allocation means for releasing said allocated message block.

4. An interprocess communications system for transferring a message from a source user process to a destination process, comprising:

a shared memory having one or more shared memory blocks, each of said one or more message blocks having a preamble portion and a message content portion configured to store message data;

a datagram socket associated with said destination process;

a message origination interprocess communications mechanism associated with the user process, coupled to said shared memory and to said datagram socket, comprising:

a source memory allocation subsystem configured to allocate one of said one or more shared memory blocks from said shared memory to transfer the message, said allocated shared memory block having a location identified by a shared memory block index, a source message transfer subsystem configured to transfer said message located at a local memory address designated by said user process to said allocated shared memory block, and a source datagram transfer subsystem configured to place said shared memory block index into said datagram socket;

a message reception interprocess communications mechanism associated with said destination user process, coupled to said shared memory and to said datagram socket, comprising, a destination datagram transfer subsystem configured to retrieve said shared memory block index from said datagram socket, a destination message transfer subsystem configured to transfer the message from said shared memory block identified by said shared memory block index to a designated local memory address associated with the destination user process, and a destination memory allocation subsystem configured to release said shared memory block previously containing the message for future use when no other destination user process is to receive the message.

5. The system of claim 4, wherein said memory allocation subsystem locks access to said shared memory block and updates said preamble of said shared memory block to indicate an in-use status of said shared memory block, the current time, the allocating process ID, and the number of receivers that are to receive the message block.

6. The system of claim 4, wherein said datagram transfer subsystem outputs a status of said datagram transmission to the source user process.

7. The system of claim 4, wherein said datagram transfer subsystem decrements a shared memory block preamble receiver count by one, said datagraph transfer subsystem indicating said shared memory block is available when said receiver count is zero.

8. The system of claim 4, wherein said datagram socket is identified by a datagram socket address received from said destination user process.

9. The system of claim 4, wherein said destination memory allocation subsystem releases said shared memory block when all destination user processes have received said message, thereby making said shared memory block available for re-use by another user process.

10. An interprocess communications system for transferring message data from a source user process to at least one destination user process in a computer-based system, the interprocess communications system comprising:

initialization means for creating and initializing a shared memory segment in a shared memory; and sending means for placing the message data to said shared memory segment and for placing message control data to a control data interprocess communications (IPC) transfer mechanism having a connectionless packetized protocol.

11. The system of claim 10, further comprising:

user process initialization means for attaching the source user process and the destination user process to said shared memory segment for each message data transfer; and receiving means for receiving said message control data from said control data IPC transfer mechanism and for using said message control data to retrieve the message data from said shared memory segment.

12. The system of claim 11, wherein said message control data comprises a shared memory block index identifying the location of said allocated message blocks containing the message data in the shared memory.

13. The system of claim 12, wherein said shared memory segment comprises one or more message blocks, each of said one or more message blocks having a preamble portion and a message content portion configured to store the message data.

14. The system of claim 13, wherein said preamble portion comprises:

an availability status region configured to contain an availability status of an associated message block;

a time allocation region configured to contain the time at which an associated message block has been allocated by a first memory allocation means;

an identification region configured to contain the identity of the source user process for which said associated message block has been allocated; and a receiving count region configured to contain a number of remaining destination processes to receive said associated message block.

15. The system of claim 14, wherein said sending means comprises:

first memory allocation means for allocating at least one of said plurality of message blocks, said allocated message blocks being of sufficient size to store the message data;

first message transfer means for transferring the message data from a local memory location associated with the source user process to said allocated message blocks, and for placing the message data in a temporary buffer when said first memory allocation means cannot allocate message blocks of sufficient size and when the source user process has messages presently pending to be transferred; and first message control transfer means for transferring said message control data to said control data IPC transfer mechanism.

16. The system of claim 15, wherein said receiving means comprises:

second message control transfer means for transferring said message control data from said control data IPC transfer mechanism to the at least one destination user process;

second message transfer means for transferring the message data from said allocated message blocks to a local memory location associated with the destination user process; and second memory allocation means for releasing said allocated message blocks.

17. The system of claim 16, further comprising:

maintenance means for maintaining the availability of said plurality of message blocks in said shared memory segment, said maintenance means periodically reading said time in said time allocation region and comparing said time to a predetermined value; and shutdown means for performing a controlled shutdown of the interprocess communications when the associated user process ceases execution, said shutdown means guaranteeing that all messages associated with said associated user process are sent to the at least one destination user process before said associated user process is terminated.

18. The system of claim 17, wherein the computer-based system provides a Unix operating system environment and wherein the implementation of the interprocess communications system is achieved utilizing Unix operating system features.

19. The system of claim 18, wherein said control data IPC transfer mechanism is a datagram socket interprocessor communications mechanism.

20. A method for transferring a message from a source user process to at least one destination user process in a computer-based system having a shared memory, the method comprising the steps of:

(1) initializing a shared memory segment in the shared memory by a memory allocation subsystem;

(2) placing the message in said shared memory segment by a message transfer subsystem; and (3) placing message control data in a control data interprocess communications (IPC) transfer mechanism having a connectionless packetized protocol.

21. The method of claim 20, further comprising the step of:

(4) receiving said message control data from said control data IPC transfer mechanism and using said message control data to retrieve the message data placed in said shared memory segment.

22. The method of claim 21, wherein said step (1) comprises the steps of:

(a) dividing said shared memory segment into one or more message blocks, (b) creating a segment descriptor identifying said allocated shared memory segment, (c) dividing each of said one or more message blocks into a preamble portion and a message content portion, said preamble portion including an availability status region, and (d) transferring said segment descriptor to the source user process and the at least one destination user process.

23. The method of claim 21, wherein said step (2) comprises the steps of:
- (a) receiving an address of a first local memory location associated with the source user process, the length of the message, and a source user process identifier from the source user process, said first local memory location containing the message data;
- (b) determining which of said plurality of message blocks are available, and allocating from said available message blocks a message block sufficient to store the message data;
- (c) transferring the message data from said first local memory location to said allocated message block;
- (d) updating, for said allocated message block, said availability status region with an unavailable status, updating a time allocation status region with the time of allocation, and updating a user process identification region with a source user process identifier.

24. The method of claim 23, wherein said step (2) further comprises the steps of:
- (e) allocating a temporary buffer to store the message data if the source user process presently has messages to be transferred and when said plurality of message blocks do not contain a message block of sufficient size to store the message data, said temporary buffer enqueued with other pending messages to be transferred from the source user process;
- (f) providing said status indication to the source user process indicating a successful message transfer when the message data has been transferred to said temporary buffer; and
- (g) transferring said enqueued message data from said temporary buffer to said allocated message block when said available message blocks are allocated.

25. The method of claim 24, further comprising the step of:
- (5) shutting down the interprocess communications system when the source user process ceases execution, comprising the steps of:
  - a) repeating step (g) until all message data enqueued in said temporary buffers have been transferred;
  - b) removing said control data IPC transfer mechanism; and
  - c) detaching the source user process from said shared memory segment.

26. The method of claim 25, further comprising the step of:
- (6) maintaining the availability of said plurality of message blocks in said shared memory segment, comprising the steps of:
  - (a) periodically reading said time allocation region and comparing said time to a predetermined value; and
  - (b) updating, for each of said allocated message blocks wherein said time is greater than said predetermined value, said availability status region with an available status.

27. The method of claim 21, wherein said message control data comprises a shared memory block index identifying the location of said shared memory segment containing the message.

28. The method of claim 21, wherein said control data IPC transfer mechanism is datagram socket IPC mechanism.

29. The system of claim 10, wherein said message control data is a shared memory block index, said shared memory block index identifying a location at which the message data is stored in said shared memory.

* * * * *